United States Patent [19]
Lautenschlager et al.

[11] Patent Number: 6,134,306
[45] Date of Patent: Oct. 17, 2000

[54] METHOD AND DEVICE FOR VARIABLE, CURRENT RATE SIGNALLING OF IN-BASED VALUE-ADDED SERVICES

[75] Inventors: Wolfgang Lautenschlager, Weissach-Flacht; Uwe Stahl, Leonberg, both of Germany

[73] Assignee: Alcatel, Paris, France

[21] Appl. No.: 09/174,399

[22] Filed: Oct. 14, 1998

[30] Foreign Application Priority Data

Oct. 15, 1997 [DE] Germany ............... 197 45 437

[51] Int. Cl.⁷ ................................................ H04M 15/00
[52] U.S. Cl. ........................ 379/114; 379/112; 379/115; 379/130; 705/37
[58] Field of Search .................... 379/114, 130, 379/127, 112, 121, 115; 705/37

[56] References Cited

U.S. PATENT DOCUMENTS

| | | | |
|---|---|---|---|
| 5,008,929 | 4/1991 | Olsen et al. | |
| 5,148,474 | 9/1992 | Haralampoulos et al. | 379/114 |
| 5,524,142 | 6/1996 | Lewis et al. | |
| 5,606,602 | 2/1997 | Johnson et al. | 379/112 |
| 5,802,502 | 9/1998 | Gell et al. | 379/112 |
| 5,822,411 | 10/1998 | Swale et al. | 379/112 |
| 5,937,045 | 8/1999 | Yaoya et al. | 379/112 |
| 6,005,926 | 12/1999 | Marshinsky | 379/114 |
| 6,009,154 | 12/1999 | Rieken et al. | 379/114 |

FOREIGN PATENT DOCUMENTS

| | | |
|---|---|---|
| 0452591 | 10/1991 | European Pat. Off. |
| 0491497 | 3/1996 | European Pat. Off. |
| 0734144 | 3/1996 | European Pat. Off. |
| 0779733 | 12/1996 | European Pat. Off. |
| 0765068 | 3/1997 | European Pat. Off. |
| 4241434 | 6/1994 | Germany. |
| 19522988 | 1/1997 | Germany. |
| 9729584 | 8/1997 | WIPO. |
| 9730543 | 8/1997 | WIPO. |

OTHER PUBLICATIONS

SOS, Eckhard: "Entgelterfassung im Vermittlungssystem s. 12", In: Unterrichtsblatter, Jg 49, Nov. 1996, S. 560–583.

Darimont, Albrecht: "Btx und DFU auf dem PC" Friedr, Vieweg & Sohn Verlag, Braunschweig, 1992, S/169–170.

*Primary Examiner*—Huyen Le
*Assistant Examiner*—Rexford Barnie
*Attorney, Agent, or Firm*—Ware, Fressola, Van Der Sluys & Adolphson LLP

[57] ABSTRACT

A method for the variable, service-specific rate signalling of value-added services by a called destination subscriber (B) who is offering IN (Intelligent Network)-based services in a telecommunications network (TK), during an actual connection to a calling A-subscriber who is requesting an offered IN-service, is characterized in that via his service provider installation (10), the destination subscriber sends a rate signal, which corresponds to the actual rate requested by the destination subscriber, to a central control logic in the TK network, that the service control point (SCP) by means of a service logic checks the entitlement of the destination subscriber to impose the rate he has requested, and that if it is compatible, the service control point routes a corresponding fee charging information via a service switching point to the requesting A-subscriber, and to a customer data acquisition (KDE) connected to the TK network, whereby the customer data acquisition calculates the fees to be paid by the calling A-subscriber. This method makes it possible for the called destination subscriber to expand value-added services, which are IN-based anyway, to variable rate charging without great additional effort; however the entitlement to the rate charging is always checked at a neutral place of the TK network.

6 Claims, 2 Drawing Sheets

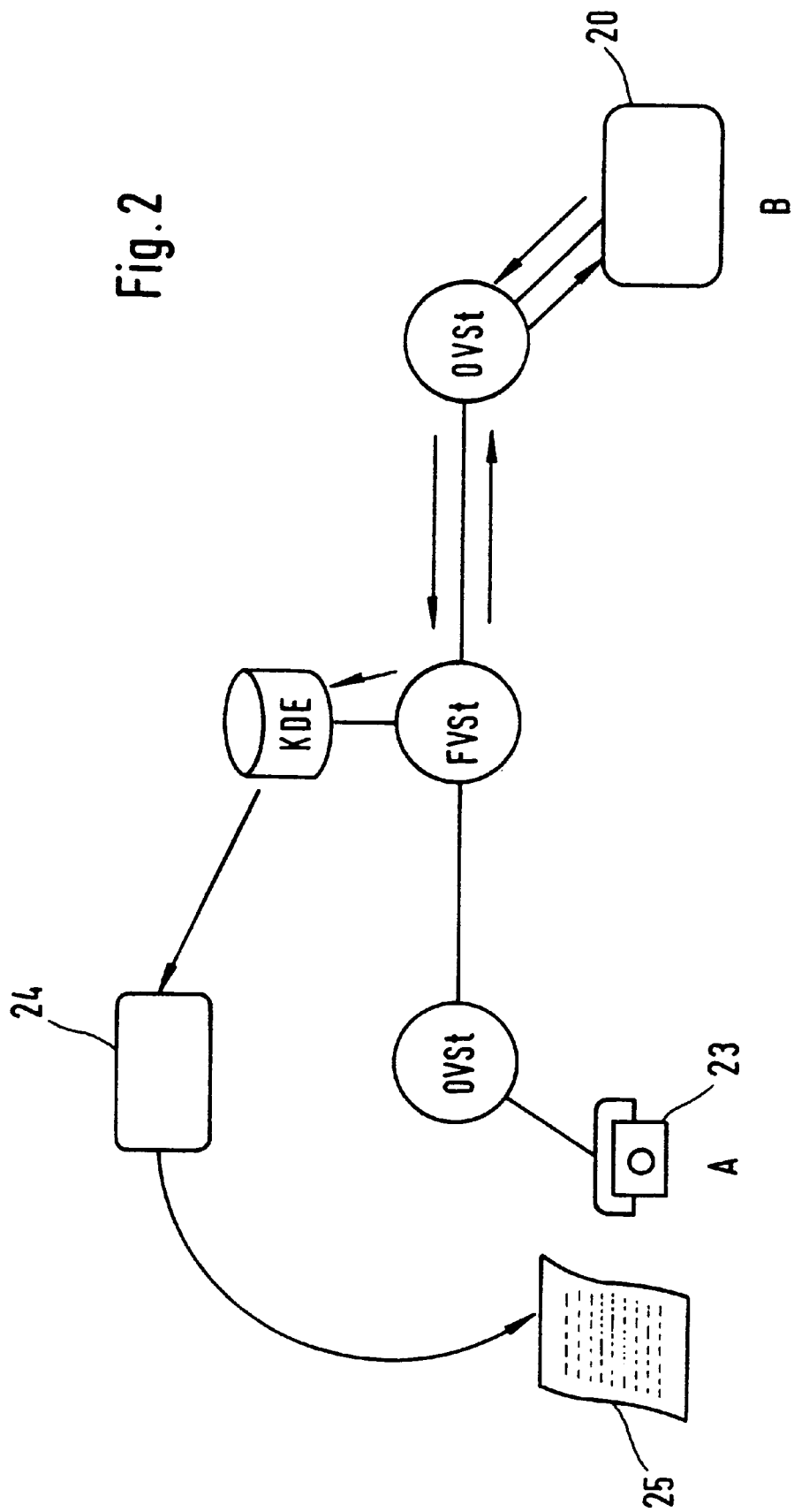

METHOD AND DEVICE FOR VARIABLE, CURRENT RATE SIGNALLING OF IN-BASED VALUE-ADDED SERVICES

TECHNICAL FIELD

The invention concerns a method and a device for the variable, service-specific rate signalling of value-added services by a called destination subscriber offering IN (Intelligent Network)-based services in a telecommunications network (TK), during an actual connection to a calling A-subscriber who is requesting an offered IN service.

BACKGROUND OF THE INVENTION

Such a method and a corresponding device are known from EP 0 491 497 B1 for example.

IN-based services have been offered for some time in TK networks, such as for example services which can be requested by network subscribers dialing call numbers from certain groups of service area codes. The called destination subscriber, who is connected to the TK network and offers the requested service, is paid for services rendered by the network operator in accordance with predetermined rates, where the network operator bills the respective fees to the calling A-subscriber who requested the respective services. Until now this took place in the form of fixed rates per call, or with time-dependent rates as described in DE 42 41 434 A1 for example. Such time-dependent charges are also known from the "Service 190" in the German Telekom area.

Because of the ever growing complexity of the charging structure for communication services due to the increase in the number of network operators and the introduction of value-added services, it is desirable if a calling A-subscriber receives information about the cost of a communication service and possibly of an additional value-added service before he uses it, and as a result he may not even use said communication service. To that end DE 195 22 988 A1 proposes to determine the fee charging data before a connection is established as a result of a connection request sent by a calling A-subscriber to the TK network, independently of the establishment of the connection, and to send said data to the subscriber.

EP 0 734 144 A2 describes a method and an arrangement for determining the user fee for a subscriber device in a telecommunications network, which enable the service provider to offer a variable rate structure. Although the called destination subscriber cannot directly influence the rate, however the rate structure, although variable, is specified by the TK network.

Finally the EP 0 491 497 B1 cited in the beginning describes a rate charging process for value-added services whereby, during a connection via an exchange, the called service provider installation directly routes an actual rate signal to a customer data acquisition where it is used it to calculate the fees to be paid by the calling A-subscriber. It is a disadvantage in this case however that the called destination subscriber can actually structure his rates without being controlled, and in any manner he wishes.

SUMMARY OF THE INVENTION

In this regard the object of the present invention is to propose a method and a corresponding device, whereby value-added services, which are IN-based anyway, can be expanded to variable rate charging by the called destination subscriber without any great additional effort; however the entitlement to the rate charging is always checked at a neutral place of the TK network.

The invention achieves this object in that, via his service subscriber device the called destination subscriber sends a rate signal, which corresponds to the actual rate requested by the called destination subscriber, to a central control logic in the form of an SCP (Service Control Point) in the TK network, that by means of a service logic the service control point checks the entitlement of the called destination subscriber to be charged at the requested rate, and that if the requested rate is compatible with the stored entitlement of the destination subscriber, a corresponding fee charging information is routed via an SSP (Service Switching Point) from the service control point to the requesting A-subscriber, as well as to a customer data acquisition connected to the TK network, which uses said information to calculate the fees to be paid by the called A-subscriber.

By means of a "User-To-SCP" signal the called destination subscriber, via his service provider installation, informs a corresponding service logic in a service control point which rate should actually apply. The SCP is then able to check the entitlement to the requested rate by means of the destination subscriber's stored data. If the entitlement exists, a corresponding fee charging information is transmitted to the calling A-subscriber and to the customer data acquisition for the purpose of calculating the charges.

A variation of the method of the invention is especially preferred, whereby the calling A-subscriber sees the actual rate on a display device and/or he can be acoustically informed thereof by his terminal. This enables the requesting A-subscriber to decide immediately whether or not to pay at the charged rate and to continue using the requested services. A subvariation can also be envisioned whereby the called A-subscriber, after receiving the first rate indication, must confirm his acceptance of the rate before the customer data acquisition receives the corresponding fee charging information and uses it to calculate the fees for the requesting A-subscriber.

In case the requested rate is incompatible with the entitlement of the called destination subscriber, it is advantageous if the service control point optically or acoustically informs the latter of the determined incompatibility, so that the destination subscriber can act accordingly and request a rate that falls within his entitlement range.

Another advantageous variation of the method of the invention provides for the entitlement of the destination subscriber offering the services to be stored in the service control point in the form of a minimum and a maximum allowable rate, and that in case of an incompatibility between the requested rate and the entitlement of the called destination subscriber a fee charging information, which corresponds to the maximum allowable rate if it exceeds, or to the minimum allowable rate if it falls short, is automatically routed to the calling A-subscriber and to the customer data acquisition.

This allows the connection to be maintained while the fees for the services being used remain within the allowable limits.

In a further development of both of the above-cited variations of the method, the determined maximum or minimum limit rate is transmitted from the service control point to the called destination subscriber, and is shown on a display unit of the terminal and/or is acoustically expressed, so that the destination subscriber can accept the rate which deviates from his request and maintain the connection, or change the requested rate, or break off the connection.

A device for performing the above-described method also falls within the framework of the invention, in which the service provider installation of the called destination subscriber has an input unit for entering requested rates and for routing the corresponding rate signals to the service control point.

Special preference is given to a further development of this configuration where the input unit includes a numerical keyboard, or a numerical keyboard in the terminal of the destination subscriber can be activated by operating a special signal button.

A voice input of the actual requested rate via the called destination subscriber's TK terminal can also be envisioned. However this requires a voice recognition device at the service control point, at least for spoken numbers.

Further advantages of the invention can be found in the description and the drawings. The previously cited features of the invention, and those indicated further on, can also be used by themselves, or several of them can be combined in any desired manner. The illustrated and described configurations should not be taken as a final listing, but they rather play a more exemplary role in the description of the invention.

BRIEF DESCRIPTION OF THE DRAWINGS

The invention is illustrated by the drawings and will be explained in greater detail by means of embodiments, where:

FIG. 2 is a circuit diagram for variable rate signalling in accordance with the state of the art.

BEST MODE FOR CARRYING OUT THE INVENTION

Figure 1:
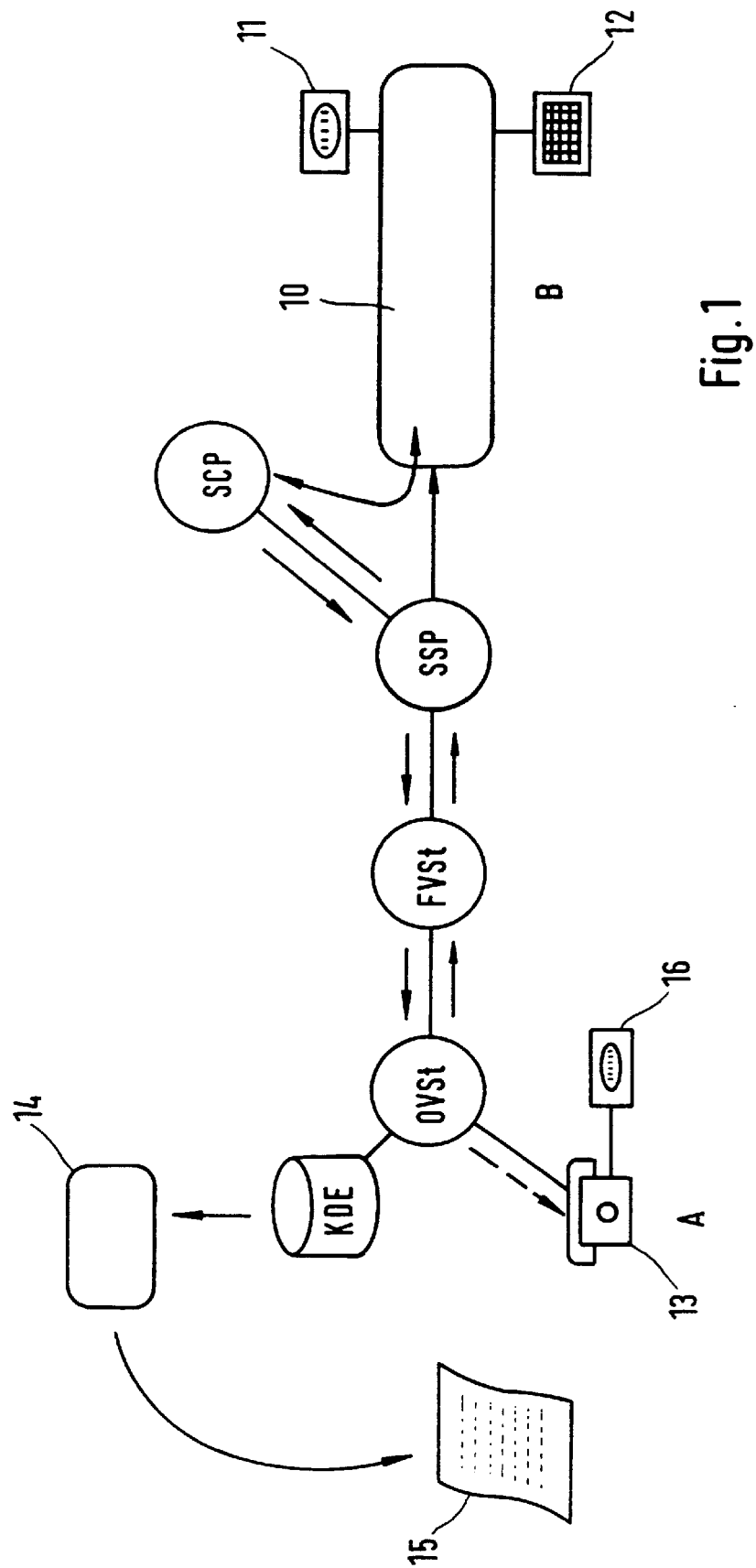
FIG. 1 is a schematized circuit for carrying out the method of the invention.

With a method of the invention such as schematically illustrated in FIG. 1, a called destination subscriber B who offers IN-based services in a TK network, can input the rate desired by the destination subscriber B, during an actual connection with a calling A-subscriber who is requesting an offered IN-service, either via an input unit 12 which is connected to his service provider installation 10, or directly and acoustically, and route the corresponding rate signals to a service control point SCP in the intelligent network.

A service logic at the service control point SCP checks the entitlement of the called destination subscriber B to impose the requested rate and, if the requested rate is compatible with the stored entitlement of the destination subscriber B, routes a corresponding fee charging information to a terminal 13 of the calling A-subscriber via a service switching point SSP, a trunk exchange FVSt, or a local exchange OVSt. At the same time a corresponding fee charging information is also routed from the service control point SCP to a customer data acquisition KDE, which calculates the fees to be paid by the calling A-subscriber and routes them to a postprocessing unit 14, which issues a corresponding bill 15 and sends it to the A-subscriber at the appropriate time.

The current rate can be shown to the called destination subscriber B or to the calling A-subscriber on a display device 11 or 16. As an alternative, or in addition thereto, the current rate can also be expressed acoustically by the service provider installation 10 or the terminal 13. When requesting a rate in this manner, the A-subscriber has the possibility of breaking off the connection if he feels the rate for the offered service is too high, and the called destination subscriber B can immediately correct any current rate that appears to be incorrect.

With corresponding arrows, FIG. 1 indicates the routing of the calling line identity from the local exchange OVSt via the trunk exchange FVSt and the service switching point SSP to the service control point SCP, while the rate signal is indicated by corresponding arrows in the other direction. A double arrow between service control point SCP and the service provider installation 10 indicates the invention's bidirectional "User-to-SCP" signalling that switches the rate signalling. In the event the rate requested by the destination subscriber B is not compatible, the latter can receive a corresponding message directly from the service control point SCP, enabling the destination subscriber B to act in accordance with the situation.

With the diagram according to the state of the art in FIG. 2, the called destination subscriber B transmits his rate via his service provider installation 20 directly to the local exchange OVSt and to the trunk exchange FVSt, which route the corresponding fee charging information without critique to the customer data acquisition KDE and to the connected postprocessing unit 24, which then issues a corresponding call charging bill 25 and sends it at the appropriate time to the A-subscriber who was using the terminal 23 and had requested the corresponding service from the destination subscriber B. The known system does not contain any further possibilities of influencing the variable, service-specific rate structure.

What is claimed is:

1. A method of variable, service-specific rate signaling for value-added services by a called destination subscriber (B) who is offering IN (Intelligent Network)-based services in a telecommunication (TK) network, during an actual connection to a calling A-subscriber who is requesting an offered IN service, characterized in that via his service provider installation (10), the called destination subscriber (B) transmits a rate signal, which corresponds to the actual rate requested by the called destination subscriber (B), to a central control logic in the form of an SCP (Service Control Point) in the TK network;

by means of a service logic, the service control point (SCP) checks the entitlement of the called destination subscriber (B) to impose the rate he has requested;

if the requested rate is compatible with the stored entitlement of the destination subscriber (B), corresponding fee charging information is routed by the service control point (SCP) via an SSP (Service Switching Point) to the requesting A-subscriber and to a customer data acquisition (KDE), from which the customer data acquisition (KDE) calculates the fees to be paid by the calling A-subscriber; and in case the requested rate is incompatible with the entitlement of the called destination subscriber (B), the service control point (SCP) informs the latter of the ascertained incompatibility in an optical or acoustical manner, and wherein the calling A-subscriber can see the actual rate on a display device (16) or can be acoustically informed thereof by his terminal (13).

2. A method as claimed in claim 1, characterized in that the entitlement of the destination subscriber (B) who is offering the service is stored in the form of a minimum and a maximum allowable rate in the service control point (SCP), and that in case the requested rate is incompatible with the entitlement of the called destination subscriber (B), a fee charging information that corresponds to the maximum allowable rate if it exceeds, or to the minimum allowable rate if it falls short, is automatically routed to the calling A-subscriber and to the customer data acquisition (KDE).

3. A method of variable, service-specific rate signaling for value-added services by a called destination subscriber (B) who is offering IN (Intelligent Network)-based services in a telecommunication (TK) network, during an actual connection to a calling A-subscriber who is requesting an offered IN service, characterized in that via his service provider installation (10), the called destination subscriber (B) transmits a rate signal, which corresponds to the actual rate requested by the called destination subscriber (B), to a central control logic in the form of an SCP (Service Control Point) in the TK network;

by means of a service logic, the service control point (SCP) checks the entitlement of the called destination subscriber (B) to impose the rate he has requested;

if the requested rate is compatible with the stored entitlement of the destination subscriber (B), corresponding fee charging information is routed by the service control point (SCP) via an SSP (Service Switching Point) to the requesting A-subscriber and to a customer data acquisition (KDE), from which the customer data acquisition (KDE) calculates the fees to be paid by the calling A-subscriber, wherein the calling A-subscriber can see the actual rate on a display device (16) or can be acoustically informed thereof by his terminal (13);

the entitlement of the destination subscriber (B) who is offering the service is stored in the form of a minimum and a maximum allowable rate in the service control point (SCP);

in case the requested rate is incompatible with the entitlement of the called destination subscriber (B), the service control point (SCP) informs the latter of the ascertained incompatibility in an optical or acoustical manner, and fee charging information that corresponds to the maximum allowable rate if it exceeds, or to the minimum allowable rate if it falls short, is automatically routed to the calling A-subscriber and to the customer data acquisition (KDE); and the ascertained maximum or minimum limit rate is transmitted to the called destination subscriber (B) by the service control point (SCP) and is shown on a display device (11) in his terminal, or is acoustically expressed.

4. A method of variable, service-specific rate signaling for value-added services by a called destination subscriber (B) who is offering IN (Intelligent Network)-based services in a telecommunication (TK) network, during an actual connection to a calling A-subscriber who is requesting an offered IN service, characterized in that via his service provider installation (10), the called destination subscriber (B) transmits a rate signal, which corresponds to the actual rate requested by the called destination subscriber (B), to a central control logic in the form of an SCP (Service Control Point) in the TK network;

by means of a service logic, the service control point (SCP) checks the entitlement of the called destination subscriber (B) to impose the rate he has requested;

if the requested rate is compatible with the stored entitlement of the destination subscriber (B), a corresponding fee charging information is routed by the service control point (SCP) via an SSP (Service Switching Point) to the requesting A-subscriber and to a customer data acquisition (KDE), from which the customer data acquisition (KDE) calculates the fees to be paid by the calling A-subscriber; and in case the requested rate is incompatible with the entitlement of the called destination subscriber (B), the service control point (SCP) informs the latter of the ascertained incompatibility in an optical or acoustical manner.

5. A method of variable, service-specific rate signaling for value-added services by a called destination subscriber (B) who is offering IN (Intelligent Network)-based services in a telecommunication (TK) network, during an actual connection to a calling A-subscriber who is requesting an offered IN service, characterized in that via his service provider installation (10), the called destination subscriber (B) transmits a rate signal, which corresponds to the actual rate requested by the called destination subscriber (B), to a central control logic in the form of an SCP (Service Control Point) in the TK network;

by means of a service logic, the service control point (SCP) checks the entitlement of the called destination subscriber (B) to impose the rate he has requested;

if the requested rate is compatible with the stored entitlement of the destination subscriber (B), a corresponding fee charging information is routed by the service control point (SCP) via an SSP (Service Switching Point) to the requesting A-subscriber and to a customer data acquisition (KDE), from which the customer data acquisition (KDE) calculates the fees to be paid by the calling A-subscriber; and the entitlement of the destination subscriber (B) who is offering the service is stored in the form of a minimum and a maximum allowable rate in the service control point (SCP), and that in case the requested rate is incompatible with the entitlement of the called destination subscriber (B), fee charging information that corresponds to the maximum allowable rate if it exceeds, or to the minimum allowable rate if it falls short, is automatically routed to the calling A-subscriber and to the customer data acquisition (KDE).

6. A method of variable, service-specific rate signaling for value-added services by a called destination subscriber (B) who is offering IN (Intelligent Network)-based services in a telecommunication (TK) network, during an actual connection to a calling A-subscriber who is requesting an offered IN service, characterized in that via his service provider installation (10), the called destination subscriber (B) transmits a rate signal, which corresponds to the actual rate requested by the called destination subscriber (B), to a central control logic in the form of an SCP (Service Control Point) in the TK network;

by means of a service logic, the service control point (SCP) checks the entitlement of the called destination subscriber (B) to impose the rate he has requested; and if the requested rate is compatible with the stored entitlement of the destination subscriber (B), corresponding fee charging information is routed by the service control point (SCP) via an SSP (Service Switching Point) to the requesting A-subscriber and to a customer data acquisition (KDE), from which the customer data acquisition (KDE) calculates the fees to be paid by the calling A-subscriber, wherein the entitlement of the destination subscriber (B) is stored in the form of a minimum and a maximum allowable rate and wherein the maximum or the minimum rate is indicated to the called destination subscriber (B) when the rate requested by the called destination subscriber (B) exceeds the maximum allowable rate or is less than the minimum rate so that the called destination subscriber (B) can accept the indicated rate and maintain the connection, or request a different rate, or break off the connection.

* * * * *